Figure 1:
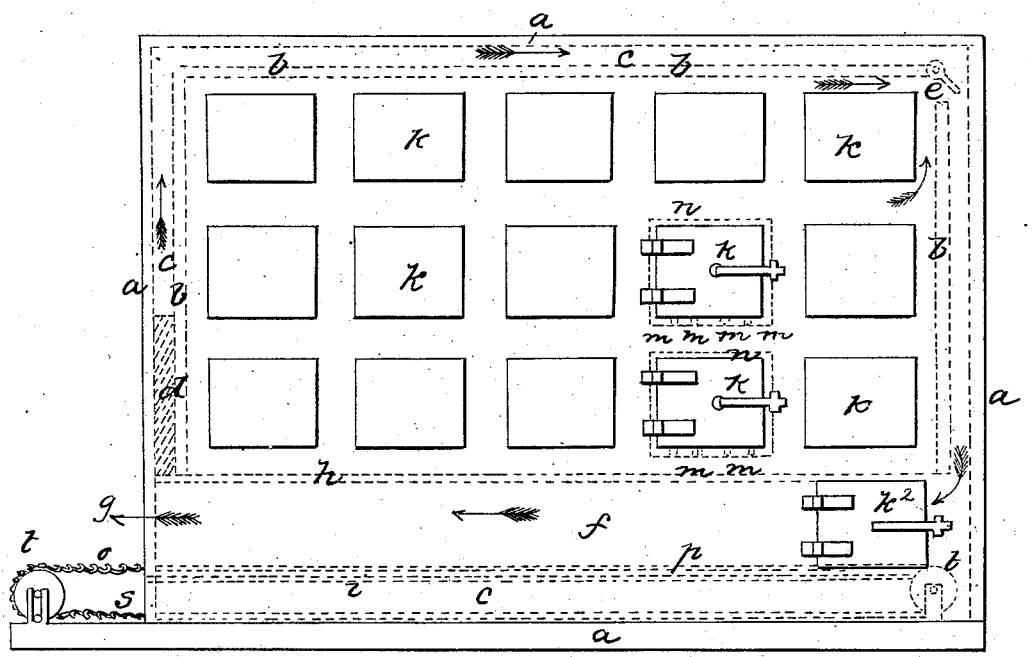
Figure 2:
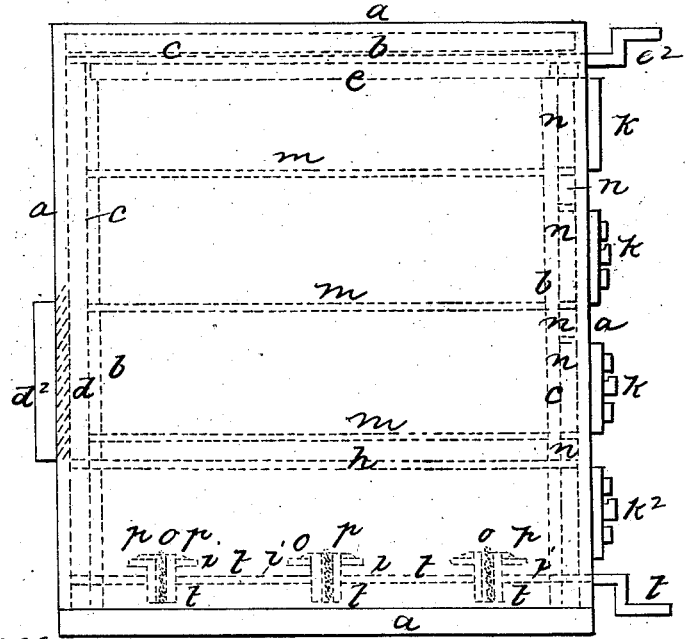

J. B. HYDE.
Making Gas from Peat.

No. 25,866. Patented Oct. 18, 1859.

Witnesses
Henry Burt
J. D. Macdonald

Inventor
J. Burwns Hyde

UNITED STATES PATENT OFFICE.

J. BURROWS HYDE, OF NEWARK, NEW JERSEY, ASSIGNOR TO PHEBE BAMMAN, OF SAME PLACE.

IMPROVEMENT IN THE METHOD OF MAKING GAS FROM PEAT.

Specification forming part of Letters Patent No. 25,866, dated October 18, 1859.

*To all whom it may concern:*

Be it known that I, J. BURROWS HYDE, of the city of Newark, county of Essex, and State of New Jersey, have invented new and useful Improvements in the Production of Gas from Peaty Matter and in the Carbonized Product Therefrom; and I declare the following to be a full and complete description thereof.

I prefer to employ that description of peaty matter which is chiefly composed of fine particles, and as found out is of a butter-like consistency, of a darkish brown or black color, and as free from leaves, fibers, or woody matter as is possible to procure it. The material should be drained, if possible, in its bed, which will greatly facilitate the "getting" of it and cheapen the cost. It should be exposed to dry on raised platforms provided with movable coverings to shelter it from rain. After it has partially dried it should be passed through a proper mill to break the lumps, which will be found moist in the center. It is then further exposed upon the platform until it has parted with all apparent moisture, when it must be removed for artificial desiccation and use, as hereinafter set forth; but it is far preferable when the carbon is to be employed in reduced particles, and the gas will be distilled more rapidly and be of more uniform quality, if the air-dried peaty matter be further ground in mills to a granular or powdery consistency and then passed through a series of bolts of varying fineness to obtain uniformity of product, according as the quality of the carbon may be needed for use in the arts, each grade of size being kept distinct in the process. When the peaty material is so far prepared, and even when in a state of fine "dry" powder, it still contains a larger percentage of moisture, even to twenty per cent. or thirty per cent. of its weight. This moisture presents the chief difficulty in producing good illuminating-gas from peaty matter, to overcome which by a cheap and uniform process forms a chief feature of my invention, the manner of air-drying hereinbefore set forth not forming a part thereof, the same having been before known.

Peat is exceedingly hygrometric, as the finely-powdered dust from air-dried peat which will flow in clouds with a slight current of air will still contain twenty per cent. or more of moisture, and when thoroughly dried by artificial heat and again exposed to the air will in a short time reabsorb moisture to the first proportion. Hence the necessity to thoroughly dry it and then distill without exposure to the air to take up moisture again. The presence of this moisture is the occasion of the excess of hydrogen in gas from distilled peat, and many plans have been employed to overcome this difficulty, such as mixing some more highly-carbonized material therewith, as oily and fatty matter, rosin, pitch, coal-tar, peat-tar, &c.; but a uniform irregularity of quality of gas seems to have attended all these systems, although many have been presented with apparatus especially arranged to insure uniformity of result, and in some cases the tar and oils evolved in distilling the peat have been passed through a heated iron vessel or pipe in the same operation. Others collect the tar, subject it to a purifying operation, and then redistill it with the peat, but in no case that I have learned with satisfying results; but I find that if the moisture be entirely expelled from the peat by artificial heat, and that it be placed in that condition in the retort without atmospheric exposure, it will give off a gas of good quality. To effect this drying by artificial heat, any convenient means may be adopted which will insure the result; but I have arranged for this purpose a drying-chamber, hereinafter described, which possesses peculiar advantages for convenience and economy for drying the material as well as for preserving the carbonized product from atmospheric air in cooling. This drying-chamber should be constructed of brick or other proper material and be placed opposite to and parallel with the retort-bench at convenient distance therefrom and of a size proportionate therewith, but not less than twice its length.

The peat having been well dried in the air and granulated, pulverized, and bolted, when machinery is had therefor, should be placed in sheet-iron cases closed at the bottom, ends, and sides and open at top, and provided with a movable top or cover to confine the material, except at the end, which, when in the retort, is at the opposite end from the conduit-pipe for the gas, where an opening of proper size should be left in the cover to allow the gas to escape from the case into the retort-space. These cases should be made of a shape to fit the inside of the retort and slide out and in freely. They should be of sheet-iron and strong enough to preserve their shape when drawn red-hot from the retort. Strong longitudinal bands should be attached under the bottom and partly up the ends of the cases to increase their strength. Strong iron loops should be attached to the ends of the retorts to facilitate the handling, and an iron-surface truck, with elevating and depressing bars, should be provided to receive and deliver the cases to and from the chamber and retort. This system is intended to apply to all ordinary gas-works for coal.

It will be found best to make the retort about twenty-four inches wide, fifteen inches high, and six feet long, the bottom horizontal like the common ⌐⌐-shaped retort; but I would corrugate the inside of the retort, the thickness of the corrugations (longitudinally) being about three-fourths of an inch and one and three-fourths inch, and the waves about three inches asunder. As I distill at a dullish-red or low heat, the coolish case and charge are apt to absorb the heat and reduce the temperature, so that oil and tar are distilled instead of gas. By these corrugations the case comes in contact only with the thick portion of the waves when the heat may be spared, while the part not in contact and the increased surfaces are intended to remedy the difficulty. (See drawings and samples.)

Figure I represents the front elevation of the drying-chamber facing the retort-bench, and Fig. II the elevation of the right-hand end of the chamber. The dotted lines show the inside part of the chamber.

The sides of the chamber are made double, with an air-space all around. $a\ a$ show the outer casing; $b\ b$, the inner case; $c\ c$, the air-space. On the back side is seen the flue $d$ to admit heat from an auxiliary furnace on commencing work, which heat circulates over the entire chamber and escapes by the bottom passage $f$, which also is used as a preparatory desiccating-space.

$e\ e$ represents a valve moved to a horizontal or a perpendicular position by the crank $e^2$, which valve is in the latter position when the auxiliary furnace is employed; but when not heated by the furnace the valve is turned horizontally to cut off circulation in the passages $c\ c$, at which time the flue $d$ is closed by the gate $d^2$ or by any other convenient means. At the bottom of the chamber and under the passage $f$ is a traveling-chain arrangement, which extends the entire length of the chamber and at one end several feet beyond the same, as seen at $g$, where the passage $f$ is left open, but closed between the rows of chains at $s$. The bottom of the drying-room of the chamber $h$ is of iron.

$i\ i$ are longitudinal strips through the chamber to support the chains $o\ o$, and $p\ p$ are strips secured thereon as guides to keep the chains in position.

$t\ t$ show the chain-pulleys, shafts, and cranks. The arrows show the direction of the circulating air-currents.

$k\ k$ are doors opening into the drying-chamber, of a size to freely admit the cases endwise and made to close tightly.

$k^2$ is a door for delivering the cases from the space $f$.

$m\ m$ are transverse bars of iron across the chamber and level with the bottoms of the doors for supporting the cases.

$n\ n$ are casings around the door-openings in the air-space.

The inside space of the chamber should be of a size to admit the cases, so that when the chamber is full the cases are not less than fifteen inches asunder all around and not less than eight inches clear at the ends. The doors will be best if arranged alternately, a door over a space of the line below. The number of rows or tiers of doors should not be less than three.

The chamber is heated by the auxiliary furnace, and the cases are filled with the air-dried material and the chamber filled with them by the doors $k$. When the material therein is sufficiently dry for distillation, the cases are drawn therefrom and placed in the retort. Meantime cases freshly filled with the material are placed on the chains at $g$ and gradually moved forward by the chains through the space $f$ until they arrive at $k^2$, from which they are removed to the chamber as required.

A small pipe with a stop-cock is fitted to the eduction-pipe of the retort to ascertain when the gas ceases to flow from the retort, when the retort should be opened. The case, with its carbonized contents, is now withdrawn red-hot upon the platform of the truck, which is rolled to the chamber. One of the doors $k$ is opened, a case withdrawn onto the platform, the hot case is pushed into the same door and the door closed quickly. The fresh case is then placed in the retort, which in turn must be shut at once, as the gas flows quickly and the complete distillation rapidly done. This operation is repeated until the heated cases are sufficiently cooled for removal from the chamber, when they are placed therefrom upon the floor of the works. The door $k^2$ is now opened, from which a case is withdrawn and inserted in the space from which the carbon-case was removed. Care should be taken when the doors $k$ are open that the valve $e$ is shut downward to prevent the escape of the heat in the chamber from the draft through the open door. These doors should be closed as quickly as possible. When the carbonized mass in the case on the floor is quite cool, no fire being left therein, which is ascertained by stirring it, it may be emptied into a proper receptacle and the case be refilled as before.

If the peat has been ground to a fine powder, it has when carbonized a great affinity for oxygen while any warmth remains and will reignite on exposure. Hence care must be taken that it be quite cool before exposing out of the case. The depositories for the carbon should be of brick and provided with means to shut out the air. The carbon thus prepared from peat will be found of surpassing purity and highly valuable for many purposes in the useful arts. That which has been reduced to an impalpable powder will be found when carbonized to be a mass of crystal forms precisely like common starch in shape, but they return to powder on the slightest touch; but that which has been granulated will retain that character so precisely resembling gunpowder that it would be readily taken therefor. Each granule is intact and clear, which, with its purity and freeness from alkali, peculiarly adapt it for decolorizing fluids, as well as for pyrotechnical purposes, and for many other uses in this art is superior to any granulated carbon hitherto made. This gas before purification contains ammonia, but rarely a trace of sulphur, and if the process is well conducted it will give but a small percentage of tar. The process is equally good when peat is distilled at a low temperature for the tar, oils, &c., and not intended to be converted into permanent gas, the carbon being the same.

I do not confine myself to the particular manner described herein for drying peat by artificial heat for distillation. Nor do I claim converting peat into charcoal by previous drying artificially and carbonizing and cooling in closed cases, as I have obtained a patent therefor, dated June 29, 1858.

What I claim in the manufacture of gas from peaty matter, and for which I desire Letters Patent, is—

1. Exposing such peaty matter to thorough desiccation by artificial heat and conveying it to the retorts without permitting it to absorb moisture from the air.

2. Granulating or powdering such peaty matter, distilling and cooling it in closed cases, as described.

3. Employing the heat evolved in cooling the carbonized material to aid in desiccating the peaty matter, as described.

J. BURROWS HYDE.

Witnesses:
HENRY BURT,
FREDERICK S. THOMAS, Jr.